Patented Aug. 22, 1933

1,923,730

UNITED STATES PATENT OFFICE 1,923,730

PRODUCTION OF ARYLGLYCINES

Joseph Everett Jewett, Buffalo, N. Y., assignor to National Aniline & Chemical Company, Inc., New York, N. Y., a Corporation of New York No Drawing. Application October 22, 1929
Serial No. 401,620

21 Claims. (Cl. 260—109)

This invention relates to the production of arylglycines, and particularly to the preparation of arylglycines by the aldehyde-cyanide process.

The reaction between an arylamine, an aldehyde, and an alkali metal cyanide in the presence of water for the production of an arylglycine is well known. Heretofore, because of the relative insolubility of the arylamine in water (the formaldehyde being soluble), it has been proposed to carry out the reaction in the presence of an organic liquid, such as alcohol, etc., which is a solvent for the arylamine. However, the use of solvents entails the disadvantage that they must be recovered in order that the process may be economically feasible.

It is an object of the invention to provide a process for the preparation of arylglycines which shall be simple, efficient, and economical.

Another object of the invention is to provide a process which shall avoid the use of alcohol or similar solvents in the preparation of arylglycines.

A further object of the invention is to provide a process in which a portion of the reaction mass shall serve as a solvent for subsequent batches of ingredients.

According to the present invention, I have found that an aqueous solution of an alkali metal arylglycinate is an excellent solvent for arylamines, particularly for the arylamine from which the arylglycinate is derived, and therefore can be used in place of water alone, or of organic liquids, as solvents for the arylamines in the aldehyde-cyanide process for the production of arylglycinates. The invention particularly contemplates the use of an aqueous solution of an alkali metal arylglycinate of the benzene series as a solvent for the arylamine from which the arylglycinate is derived, and especially an aqueous solution of the alkali metal phenylglycinate, e. g. potassium phenylglycinate, as a solvent for aniline, in the production of alkali metal arylglycinate. Preferably, a heel or portion of mother liquor from a previous operation, which consists essentially of a solution of alkali metal arylglycinate and unreacted arylamine in water is used as a solvent in the reaction.

As an illustrative embodiment of a manner in which the invention may be practiced the following example is presented. The parts are by weight.

*Example.*—136 parts aniline are dissolved at 30° C. in 122 parts of a saturated solution of potassium phenylglycinate (containing about 47.5% of the phenylglycinate) in a reaction vessel equipped with an agitator and a reflux condenser, and 4 parts of a 45 per cent. caustic potash solution are added to the resulting solution, followed by the addition of 47 parts of a 37% solution of formaldehyde. 102 parts potassium cyanide solution, 36.1 per cent. strength, are then gradually added over a period of two hours, maintaining the temperature at about 90°-100° C. The solution may become cloudy through the addition of the formaldehyde, but this cloudiness will usually have disappeared by the time all the cyanide is added. Heating is then continued for about 3 or 4 hours after all the potassium cyanide has been added. The reaction mass consists essentially of a saturated solution of potassium phenylglycinate and unreacted aniline in water with some alkali present. A heel of about 130 to 140 parts of the reaction mass is left in the reaction vessel and the balance of the reaction mass is treated for the recovery of the potassium phenylglycinate, as by removing the aniline by steam distillation and evaporating the residue to dryness.

The heel may be used subsequently in place of the saturated water solution of potassium phenylglycinate in the above reaction in producing additional quantities of the latter, allowance being made for the aniline (about 27 to 29 parts) and the alkali (about 0.5 to 0.7 parts) which it contains.

The invention is not limited to the details or the process of the above example. If desired, the reaction mass may be steam distilled to remove aniline before removing a portion of mother liquor for reuse. Also, where the reaction is carried out in more dilute solution, the portion of mother liquor may be removed before or after concentrating the reaction mass. Further, the invention is not limited to the use of saturated solutions of arylglycinates, since more dilute solutions may be used.

The invention is also applicable to the production of the corresponding arylglycines from the homologues or analogues of aniline, such as the toluidines, the xylidines, naphthylamines, etc.

Since certain changes in carrying out the above process which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In the production of an arylglycine by the interaction of an arylamine with formaldehyde and a water-soluble metal cyanide, the improvement which comprises treating the arylamine dissolved in an aqueous solution of an arylglycinate with formaldehyde and the water-soluble metal cyanide.

2. In the production of an arylglycine by the interaction of an arylamine with formaldehyde and a water-soluble metal cyanide, the improvement which comprises treating the arylamine dissolved in an alkaline aqueous solution of an arylglycinate with formaldehyde and the water-soluble metal cyanide.

3. In the production of an arylglycine by the interaction of an arylamine with formaldehyde and an alkali metal cyanide, the improvement which comprises treating the arylamine dissolved in an alkaline aqueous solution of an alkali metal arylglycinate with formaldehyde and the alkali metal cyanide.

4. In the production of an arylglycine by the interaction of an arylamine with formaldehyde and an alkali metal cyanide, the improvement which comprises treating the arylamine dissolved in an aqueous solution of the corresponding alkali metal arylglycinate with formaldehyde and the alkali metal cyanide.

5. In the production of an arylglycine by the interaction of an arylamine with formaldehyde and an alkali metal cyanide, the improvement which comprises treating the arylamine dissolved in an alkaline aqueous solution of the corresponding alkali metal arylglycinate with formaldehyde and the alkali metal cyanide.

6. In the production of an arylglycine by the interaction of an arylamine of the benzene series with formaldehyde and an alkali metal cyanide, the improvement which comprises treating the arylamine dissolved in an alkaline aqueous solution of the corresponding alkali metal arylglycinate with formaldehyde and the alkali metal cyanide.

7. In the production of phenylglycine by the interaction of aniline with formaldehyde and an alkali metal cyanide, the improvement which comprises treating aniline dissolved in an aqueous solution of an alkali metal phenylglycinate with formaldehyde and the alkali metal cyanide.

8. A process for the production of an alkali metal phenylglycinate which comprises treating aniline dissolved in an alkaline aqueous solution of the corresponding alkali metal phenylglycinate with formaldehyde and an alkali metal cyanide.

9. A process for the production of potassium phenylglycinate which comprises treating aniline dissolved in an alkaline aqueous solution of potassium phenylglycinate with formaldehyde and potassium cyanide.

10. In the production of an arylglycine by the interaction of an arylamine with formaldehyde and a water-soluble metal cyanide, the improvement which comprises reacting the arylamine with formaldehyde and the water-soluble metal cyanide in alkaline solution to produce an alkaline solution containing the arylglycinate, forming another reaction mixture containing an arylamine, formaldehyde, a water-soluble metal cyanide and the resulting alkaline solution, and reacting said arylamine, formaldehyde, and water-soluble metal cyanide in the resulting reaction mixture.

11. In the production of an arylglycine by the interaction of an arylamine with formaldehyde and an alkali metal cyanide, the improvement which comprises reacting the arylamine with formaldehyde and the alkali metal cyanide in alkaline solution to produce an alkaline solution containing an arylglycinate, and interacting an arylamine dissolved in a portion of the resulting alkaline solution with formaldehyde and an alkali metal cyanide.

12. In the production of phenylglycine, the improvement which comprises reacting aniline with formaldehyde and an alkali metal cyanide in alkaline solution to produce an alkaline solution containing the corresponding alkali metal phenylglycinate, separating a portion of the resulting alkaline solution, and interacting aniline, formaldehyde and an alkali metal cyanide in a reaction mixture including said portion.

13. In the production of an alkali metal arylglycinate by the interaction of an arylamine with formaldehyde and an alkali metal cyanide, the improvement which comprises reacting the arylamine with formaldehyde and the alkali metal cyanide in alkaline solution to produce an alkaline solution containing the arylglycinate, dividing the resulting solution into portions, and interacting the arylamine with formaldehyde and an alkali metal cyanide in another reaction mixture including one of said portions.

14. In the production of an alkali metal arylglycinate by the interaction of an arylamine with formaldehyde and an alkali metal cyanide, the improvement which comprises reacting the arylamine with formaldehyde and the alkali metal cyanide in alkaline solution to produce an alkaline solution containing the arylglycinate, dividing the resulting solution into portions, and interacting the arylamine with formaldehyde and an alkali metal cyanide in a reaction mixture including one of said portions.

15. In the production of an alkali metal arylglycinate by the interaction of an arylamine with formaldehyde and an alkali metal cyanide, the improvement which comprises reacting the arylamine with formaldehyde and the alkali metal cyanide in alkaline solution to produce an alkaline solution containing the arylglycinate, dissolving an arylamine in the resulting solution, and reacting said dissolved arylamine with formaldehyde and an alkali metal cyanide.

16. A process for the production of an alkali metal arylglycinate which comprises treating an arylamine with formaldehyde and an alkali metal cyanide in alkaline solution in the presence of an aqueous solution of the corresponding alkali metal arylglycinate as a solvent for the arylamine, removing a portion of the mother liquor and subsequently carrying out the said reaction in the presence of the removed portion of mother liquor.

17. A process for the production of an alkali metal phenylglycinate which comprises treating aniline with formaldehyde and an alkali metal cyanide in alkaline solution in the presence of an aqueous solution of an alkali metal phenylglycinate as a solvent for the aniline, removing a portion of the mother liquor and subsequently carrying out the said reaction in the presence of the removed portion of mother liquor.

18. A process for the production of a potassium arylglycinate which comprises treating an arylamine of the benzene series with formaldehyde and potassium cyanide in the presence of an aqueous solution of the corresponding potassium arylglycinate as a solvent for the arylamine, removing a portion of the mother liquor and subsequently carrying out the reaction of an arylamine, formaldehyde, and potassium cyanide in alkaline solution in the presence of the removed portion of mother liquor as a solvent for the arylamine.

19. A process for the production of potassium phenylglycinate which comprises treating aniline with formaldehyde and potassium cyanide in alkaline solution in the presence of a solution of potassium phenylglycinate, removing a portion of the mother liquor and subsequently carrying out the said reaction in the presence of the removed portion of mother liquor.

20. In the production of an arylglycine by the interaction of an arylamine, formaldehyde, and a water-soluble metal cyanide, the improvement which comprises dissolving the arylamine in a saturated solution of the corresponding alkali-metal arylglycinate, and treating the resulting solution with caustic alkali, formaldehyde and the cyanide.

21. A process for the production of an arylglycine which comprises dissolving about 1.5 mols arylamine in a saturated solution of the corresponding potassium arylglycinate, and treating the resulting solution with caustic alkali, about .6 mols formaldehyde and an alkali metal cyanide.

JOSEPH EVERETT JEWETT.